J. KLIMA.
AUTOMOBILE ATTACHMENT.
APPLICATION FILED MAR. 22, 1919.
1,317,084.
Patented Sept. 23, 1919.
2 SHEETS—SHEET 1.
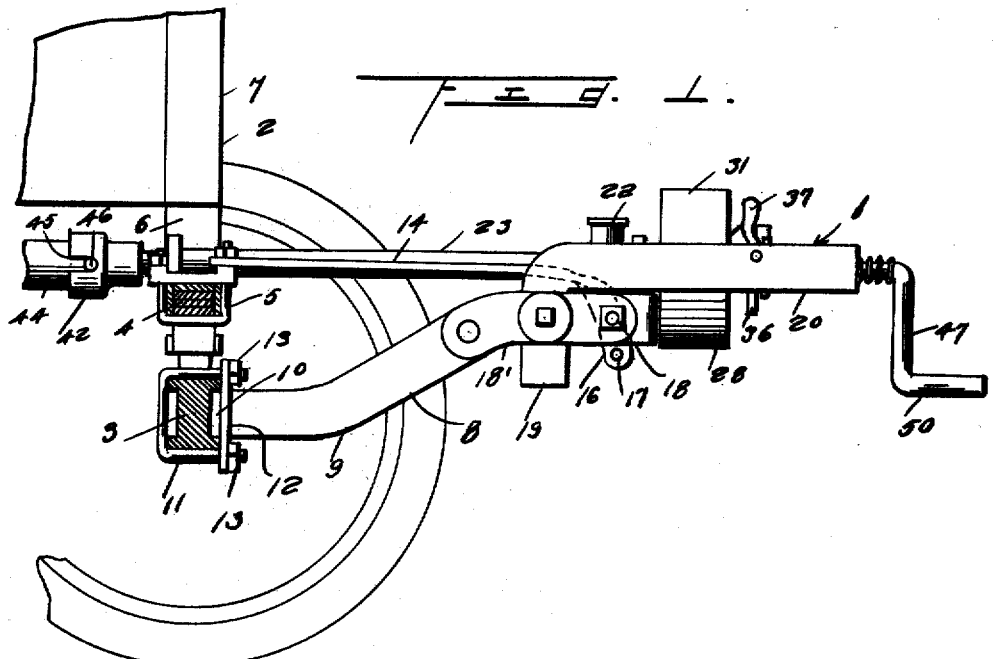
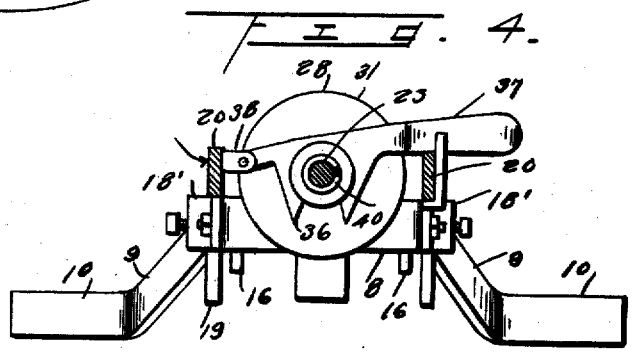
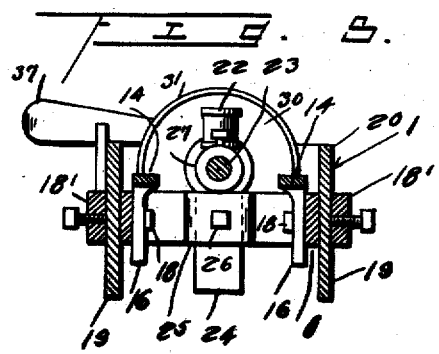
Inventor
J. Klima.
By [signature], Attorney.

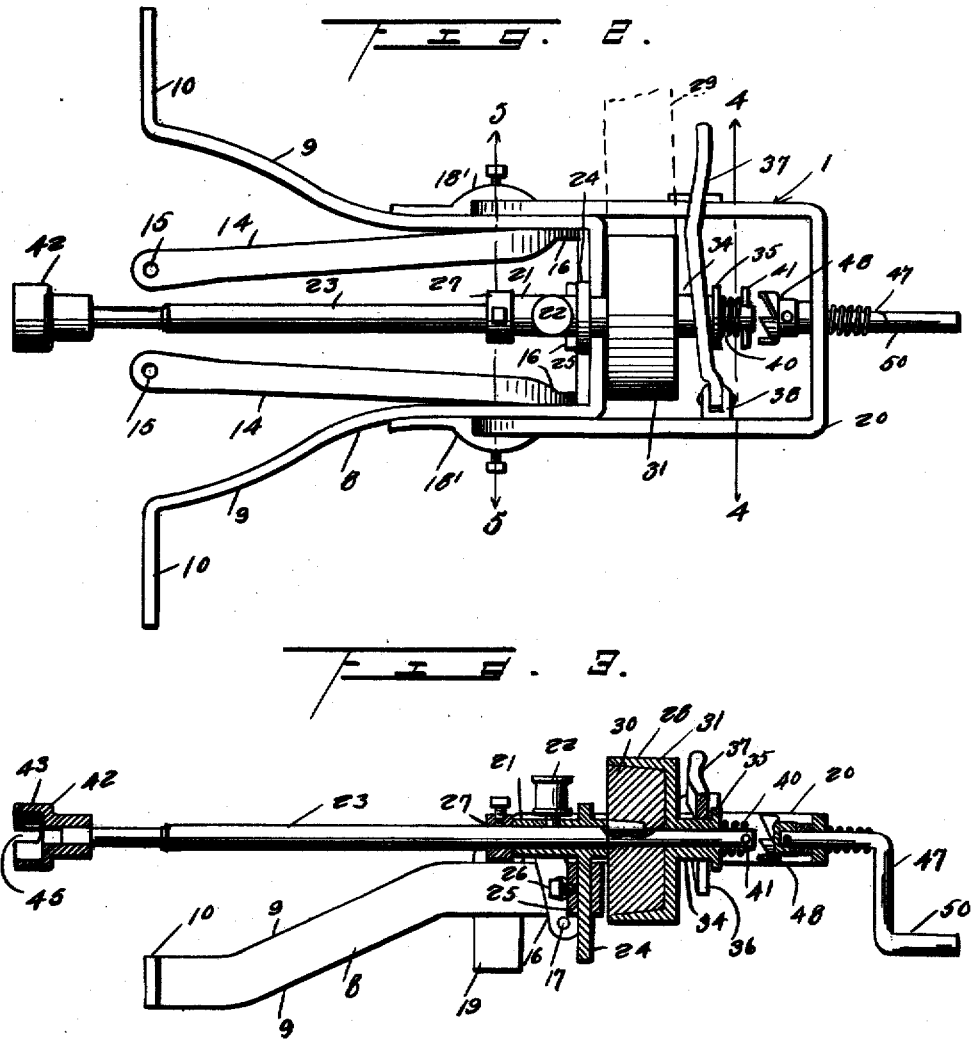

UNITED STATES PATENT OFFICE.

JOHN KLIMA, OF TAYLOR, TEXAS.

AUTOMOBILE ATTACHMENT.

1,317,084.  Specification of Letters Patent.  Patented Sept. 23, 1919.

Application filed March 22, 1919. Serial No. 284,299.

*To all whom it may concern:*

Be it known that I, JOHN KLIMA, a citizen of the Republic of Czecho-Slovak, residing at Taylor, in the county of Williamson and State of Texas, have invented certain new and useful Improvements in Automobile Attachments; and I do hereby declare the following to be a full, clear, and exact description of the invention, such as will enable others skilled in the art to which it appertains to make and use the same.

This invention relates to automobile attachments and the primary object of the invention is to provide an improved means, whereby the power of the driving motor of the automobile may be utilized for driving various machines such as wood sawing machines, silo cutters, barn elevators, corn mills and shellers, etc.

Another object of the invention is to provide an improved power attachment for automobiles, which can be readily attached thereto and provided with means for attaching the power shaft directly to the crank receiving end of the crank shaft.

A further object of the invention is to provide means for transmitting the power from the device to the machinery to be operated, in which the motion of the machinery may be stopped, without stopping the motor of the vehicle.

A further object of the invention is to provide improved means for attaching the device to a motor vehicle, whereby the power shaft of the same may be adjusted so as to bring the same in direct alinement with the crank shaft of the engine.

A still further object of the invention is to provide an improved power attachment for motor vehicles of the above character, which is durable and efficient in use, one that is simple and easy to manufacture, and one that can be placed upon the market at a reasonable cost.

With these and other objects in view, the invention consists in the novel construction, arrangement and formation of parts, as will be hereinafter more specifically described, claimed and illustrated in the accompanying drawings, forming a part thereof, in which:

Figure 1 is a side elevation of the improved power device showing the same attached to a motor vehicle, the motor vehicle being shown partly in section.

Fig. 2 is a plan view of the device.

Fig. 3 is a central longitudinal vertical section through the device.

Fig. 4 is a cross section taken on the line 4—4 of Fig. 2, and

Fig. 5 is a detail section taken on the line 5—5 of Fig. 2.

Referring to the drawings in detail, wherein similar reference characters designate corresponding parts throughout the several views, the numeral 1 generally indicates the improved device, which is adapted to be applied to a motor vehicle 2. While the device is specially adapted to be used in connection with the Ford automobile, it is to be understood that the same may be used with any preferred type of motor vehicle.

The motor vehicle 2 includes the front axle 3 of the ordinary I-beam construction to which is secured in the ordinary manner the semi-elliptical leaf spring 4, the upper central portion of which has secured thereto by a U-bolt 5 the radiator supporting bracket 6, to which the ordinary radiator 7 is secured.

The improved device 1 includes a substantially U-shaped supporting frame 8 having the legs 9 thereof turned outwardly in opposite directions toward the free ends thereof and having the free ends bent at right angles to provide feet 10, which are adapted to engage the axle 3 intermediate the upper and lower flanges thereof. The feet 10 are adapted to be held in position by means of U-bolts 11 which embrace the axle and the terminals of the bolts are connected by a plate 12, which is held in position by suitable nuts 13. The plate 12 engages the outer faces of the feet 10 to prevent displacement thereof. The U-shaped bracket is held against accidental displacement and distortion by means of braces 14, which are converged toward the inner end thereof and are held against displacement by means of the U-bolts 5, which hold the spring secured to the radiator brackets. The inner terminals of the braces 14 are apertured as at 15 to receive one leg of the U-shaped bolt 5. The outer terminals of the braces 14 are twisted at right angles to form bracket engaging feet 16, which are bent downwardly at right angles to the main body of the braces 14. The feet 16 are provided with a plurality of apertures 17, any one of which is adapted to receive a bolt 18 which extends through the legs 9 of the U-shaped bracket 8. Suitable nuts are threaded on the bolts and hold the braces in position. It can be seen that by placing the bolts 18 in different apertures 17 the same can be readily connected to different sized machines.

The legs 9 of the U-shaped bracket 8 have secured to the opposite sides thereof adjacent to the forward end of the bracket guides 18' which receive the downwardly extending right angularly disposed feet 19 of the supplemental U-shaped frame 20, which extends forwardly of the bracket 8 and in a plane above the same. A relatively long bearing 21 equipped with an oil cup 22 or other lubricating means receives the power shaft 23, which extends longitudinally of the bracket 8 and frame 20. The forward end of the bearing 21 carries a depending arm 24, which is slidably received in a guide bracket 25, secured to the inner surface of the bight portion of the U-shaped bracket 8. A suitable set screw 26 holds the plate in adjusted position. This forms means, whereby the power shaft 23 may be raised and lowered so as to bring the same in direct alinement with the crank shaft of the engine. A collar 27 is removably secured to shaft 23 and engages the bearing 21 and prevents forward movement of the power shaft in relation thereto. A cone clutch 28 is arranged on the shaft 23 and engages the forward face of the bearing to prevent rearward movement of the shaft in relation thereto. The clutch 28 forms means whereby the belt 29, which is trained around the same, may be disconnected from the power shaft so as to stop the machinery to which the same is connected when so desired without stopping the motor of the vehicle. The clutch 28 includes the inner cone-shaped body 30, which is secured to the shaft, and the outer member 31 including the circular plate 32 and the annular rearwardly extending flange 33, which has the inner surface thereof flared outwardly to conform to the configuration of the cone-shaped member 30, so that when the same is in engagement with the cone-shaped member 30, the same will readily rotate therewith. The circular body 32 carries the sleeve 34 having the upstanding annular flange 35 which rotatably receives the forked member 36 formed on the lever 37, which has one end thereof pivotally connected to the bracket 38 secured to one leg of the U-shaped frame 20. The free end of the lever 37 is arranged to be normally received by the keeper 39 carried by the opposite leg of the frame 20 and holds the clutch sections in engagement with each other. When it is desired to remove the clutch sections out of engagement with each other, the lever is operated, so as to lift the same upwardly out of engagement with the keeper and then forwardly, which slides the sleeve of the outer section 32 forwardly. A spring 40 is coiled around the shaft 23 and is confined between the flange 35 and the pin 41 which extends diametrically through the forward end of the shaft and this spring normally tends to hold the clutch sections in engagement with each other.

The inner end of the shaft 23 is squared, and non-rotatably receives the head 42 having a socket 43 for receiving the crank receiving end 44 of the crank shaft of the engine. The head 42 is provided with diametrically opposite grooves 45, which are adapted to receive the pin 46 which extends diametrically through the crank shaft. Thus it will be seen that when the device is placed in position and the head in engagement with the crank shaft, the power shaft 23 will be rotated therewith.

It is to be understood that the ordinary hand crank is removed from the vehicle and hand crank 47 is rotatably carried by the bight portion of the U-frame 20 and the same carries a removable clutch section 48, which is adapted to engage the pin carried by the forward end of the power shaft, whereby the same may be readily rotated to crank the engine. A contractile coil is coiled around the crank 47 and is confined between the handle 50 thereof and the frame 20 and normally tends to disengage the clutch section from the pin carried by the forward end of the shaft.

From the foregoing description, it can be seen that an improved device is provided for motor vehicles, whereby the power of the driving motor may be utilized for running any kind of machinery, without straining the motor.

In practice, I have found that the form of my invention illustrated in the accompanying drawings and referred to in the above description, as the preferred embodiment, is the most efficient and practical; yet realizing the conditions concurrent with the adoption of my device will necessarily vary, I desire to emphasize that various changes in details of construction, proportion and arrangement of parts may be resorted to, when required without sacrificing any of the advantages of my invention as set forth.

What I claim as new is:

1. A power attachment for motor vehicles comprising a U-shaped frame having the legs thereof diverged in opposite directions, outwardly extending feet formed on the terminals of the legs, means adapted to engage said legs to hold the same in engagement with the front axle of the vehicle, an adjustable U-shaped frame carried by the first mentioned frame, an adjustable bearing carried by said first mentioned frame, a power shaft rotatably mounted on the bearing, means detachably connecting the power shaft to the crank shaft of the engine, a clutch pulley secured to the power shaft, and a hand crank carried by the second mentioned frame and arranged to detachably engage the forward end of the power shaft, as and for the purpose specified.

2. In a device of the class described, the combination with a motor vehicle of the ordinary construction comprising an axle, a radiator, and springs flexibly connecting the radiator and axle, a U-shaped frame having the legs thereof diverged in opposite directions, outwardly extending feet formed on the terminals of the legs arranged to engage the axle, means for detachably securing the feet in position on the axle, a forwardly extending second U-shaped frame having downwardly extending feet, brackets formed on the opposite sides of the legs of the first mentioned U-shaped frame adjacent to the forward end thereof arranged to slidably receive the downturned feet of the second mentioned U-shaped frame, means adjustably securing the feet in position, brace rods adjustably carried by the first mentioned U-shaped frame and arranged to be detachably secured to the springs of the vehicle, an adjustable bearing carried by the first mentioned frame, a power shaft rotatably carried by the bearing, means detachably securing the power shaft in engagement with the crank shaft of the engine, a clutch pulley carried by the shaft, means normally holding the sections of the clutch pulley in engagement with each other, and means for shifting the outer section of the clutch pulley, as and for the purpose specified.

In testimony whereof I affix my signature in presence of two witnesses.

JOHN KLIMA.

Witnesses:
JOHN TOMANCAK,
JOHN KROFF.

Copies of this patent may be obtained for five cents each, by addressing the "Commissioner of Patents, Washington, D. C."